United States Patent
Seo et al.

(10) Patent No.: US 10,394,364 B2
(45) Date of Patent: Aug. 27, 2019

(54) TOUCH PRESSURE SENSITIVITY CORRECTION METHOD AND COMPUTER-READABLE RECORDING MEDIUM

(71) Applicant: HiDeep Inc., Gyeonggi-do (KR)

(72) Inventors: Bong Jin Seo, Gyeonggi-do (KR); Ho Jun Moon, Gyeonggi-do (KR); Myung Jun Jin, Gyeonggi-do (KR); Hwan Hee Lee, Gyeonggi-do (KR); Tae Hoon Kim, Gyeonggi-do (KR); Se Yeob Kim, Gyeonggi-do (KR); Won Woo Lee, Gyeonggi-do (KR); Sang Sic Yoon, Gyeonggi-do (KR); Bon Kee Kim, Gyeonggi-do (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 15/745,752

(22) PCT Filed: May 26, 2016

(86) PCT No.: PCT/KR2016/005563
§ 371 (c)(1),
(2) Date: Jan. 18, 2018

(87) PCT Pub. No.: WO2017/018650
PCT Pub. Date: Feb. 2, 2017

(65) Prior Publication Data
US 2018/0210599 A1    Jul. 26, 2018

(30) Foreign Application Priority Data

Jul. 24, 2015 (KR) ........................ 10-2015-0104985

(51) Int. Cl.
*G06F 3/041* (2006.01)
*G06F 3/044* (2006.01)

(52) U.S. Cl.
CPC ............ *G06F 3/0414* (2013.01); *G06F 3/041* (2013.01); *G06F 3/044* (2013.01)

(58) Field of Classification Search
CPC .............................. G06F 3/0414; G06F 3/044
(Continued)

(56) References Cited

U.S. PATENT DOCUMENTS

| 2009/0066673 A1 | 3/2009 | Molne et al. |
| 2013/0082973 A1 | 4/2013 | Wurzel et al. |

(Continued)

FOREIGN PATENT DOCUMENTS

| CN | 106201053 A | 12/2016 |
| JP | 2012103995 | 5/2012 |

(Continued)

OTHER PUBLICATIONS

Machine Translation of JP 2012103995 (Year: 2019).*
(Continued)

*Primary Examiner* — Michael Pervan
(74) *Attorney, Agent, or Firm* — The Belles Group, P.C.

(57) ABSTRACT

A touch pressure sensitivity correction method may be provided that includes: defining a plurality of reference points on a touch sensor panel; generating a reference data for a capacitance change amount sensed by applying the same pressure to the plurality of reference points; generating an interpolated data corresponding to a capacitance change amount for a random point present between the plurality of reference points; calculating, on the basis of the reference data and interpolated data, with respect to the reference points and the random point respectively, a correction factor for correcting a sensitivity of a touch input device to a target value; and correcting uniformly for the touch pressure sensitivity of the touch input device by applying the calculated correction factor to each corresponding point.

12 Claims, 19 Drawing Sheets

(58) Field of Classification Search
USPC .................. 178/18.01–19.07; 345/173–178
See application file for complete search history.

(56) References Cited

U.S. PATENT DOCUMENTS

| | | |
|---|---|---|
| 2014/0225874 A1 | 8/2014 | Snedeker |
| 2015/0049064 A1 | 2/2015 | Shin |
| 2018/0088721 A1 | 3/2018 | Moon et al. |

FOREIGN PATENT DOCUMENTS

| | | |
|---|---|---|
| JP | 2013/097628 A | 5/2013 |
| KR | 1020110134155 | 12/2011 |
| KR | 1020130060716 | 6/2013 |
| KR | 1020140068257 | 6/2014 |
| KR | 1020150020774 | 2/2015 |
| WO | WO 2012/050875 A1 | 4/2012 |
| WO | WO 2014/073586 A1 | 5/2014 |

OTHER PUBLICATIONS

International Search Report for corresponding PCT/KR2016/00563, dated Sep. 23, 2016. WO.
Chinese Office Action dated Oct. 8, 2018.
Japanese Office Action for Related Application No. JP 2018-502659, dated Nov. 27, 2018.
European Search Report for Related Application EP 16830683, dated Feb. 4, 2019.

\* cited by examiner

【Fig. 1】
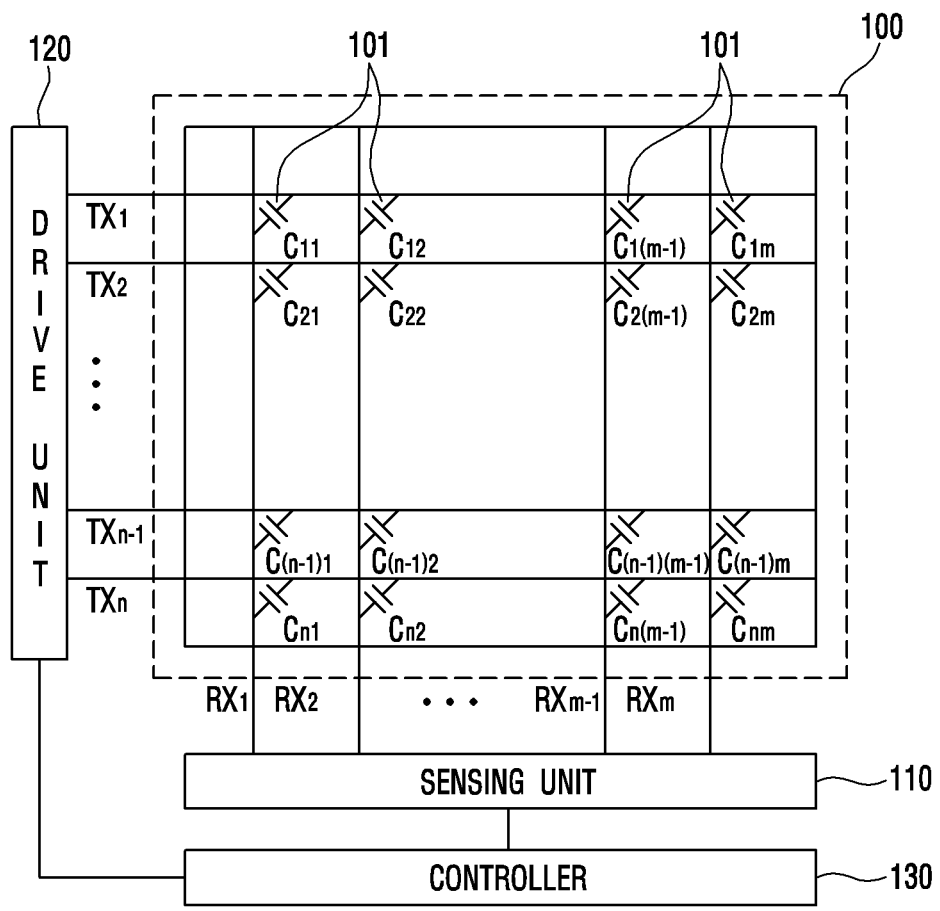
【Fig. 2】
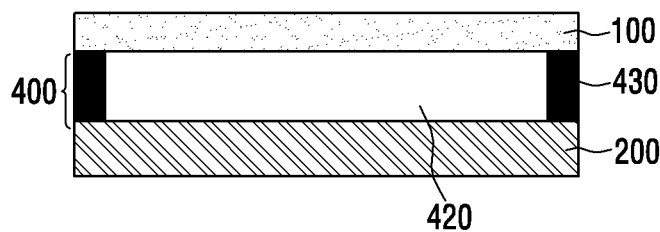

【Fig. 3a】
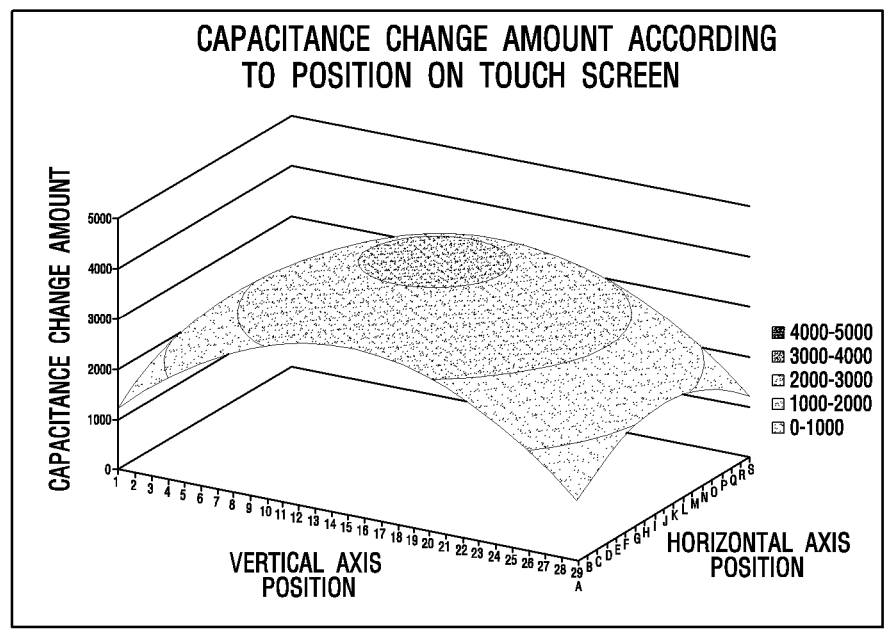
【Fig. 3b】
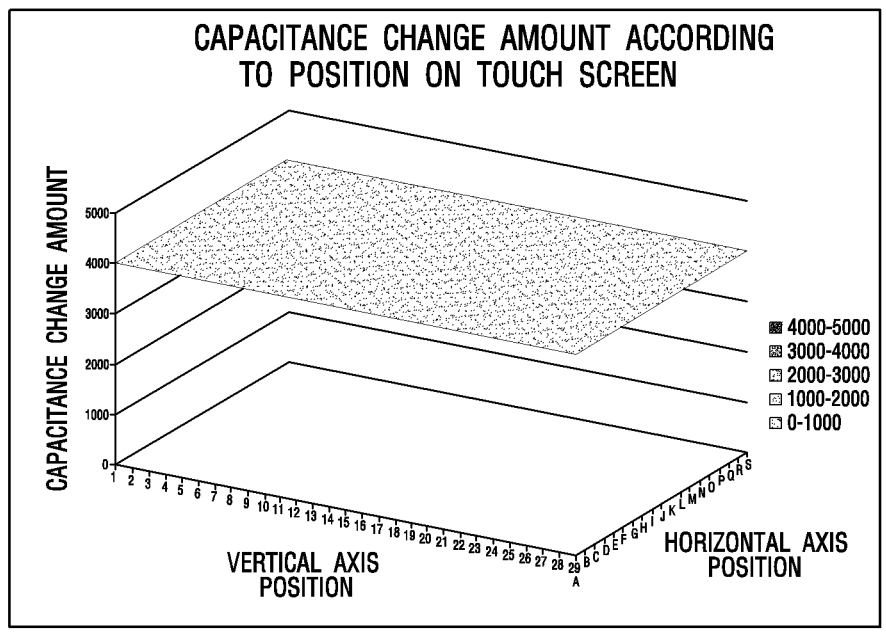

[Fig. 4]
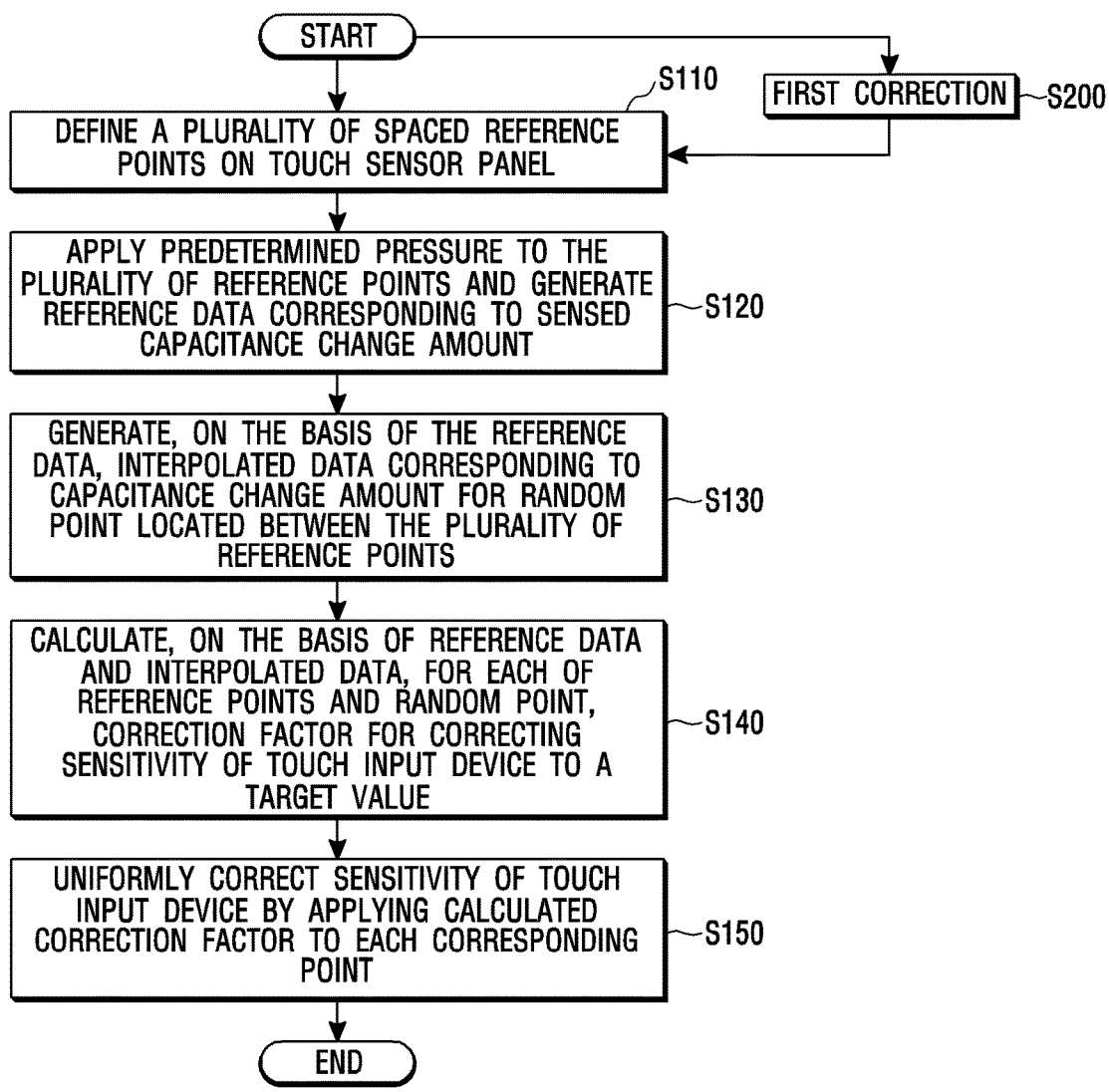

【Fig. 5a】
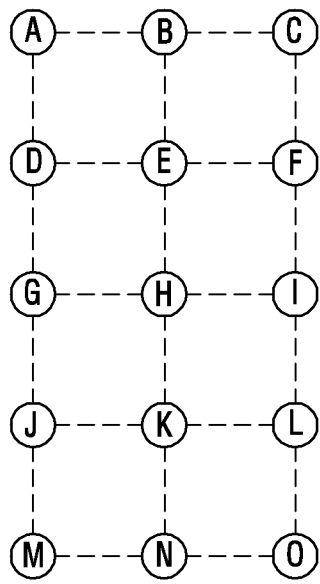
【Fig. 5b】
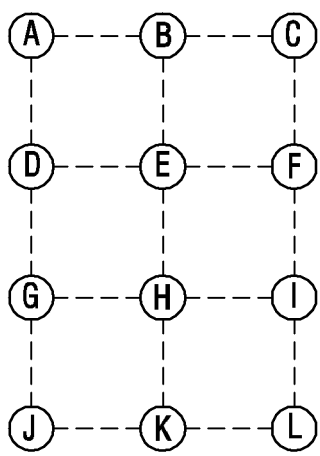

[Fig. 6]
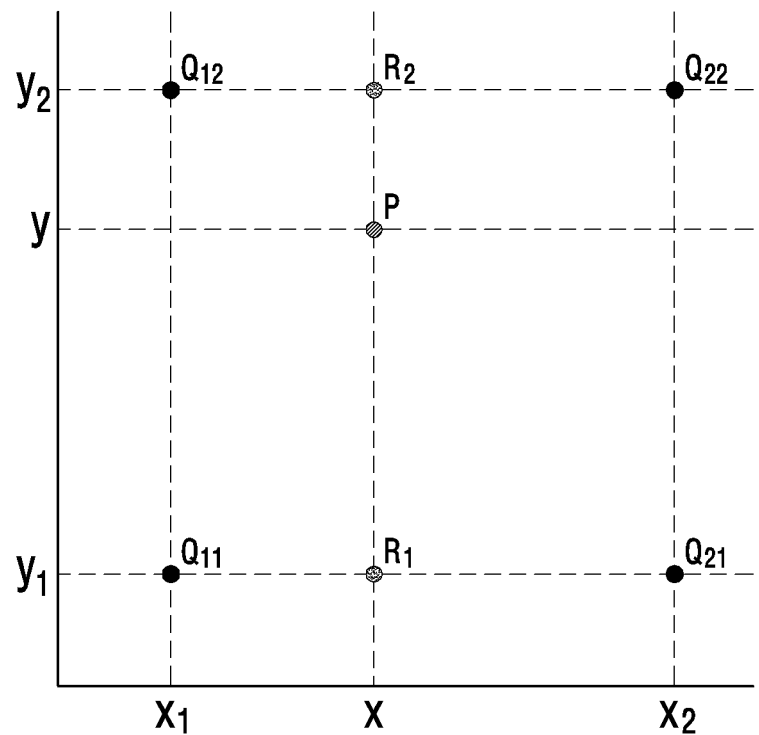
[Fig. 7]
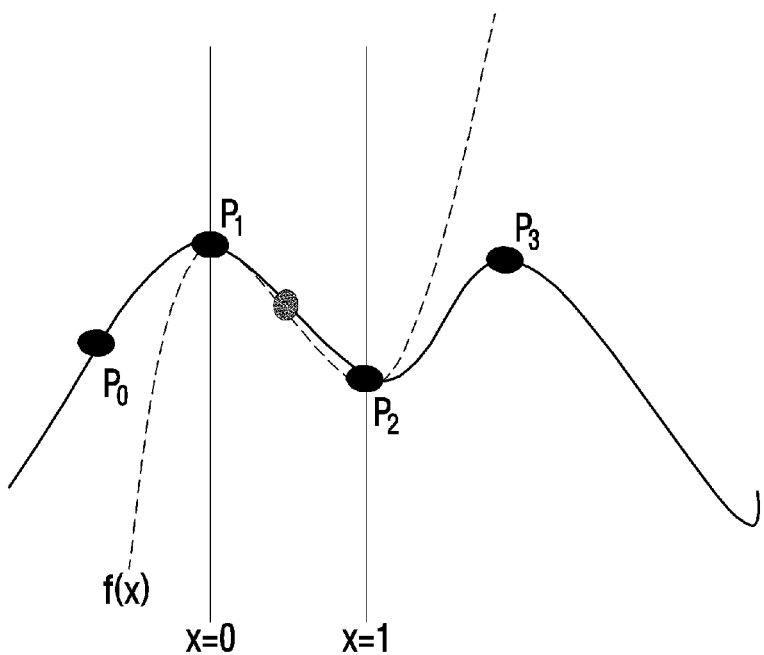

【Fig. 8】
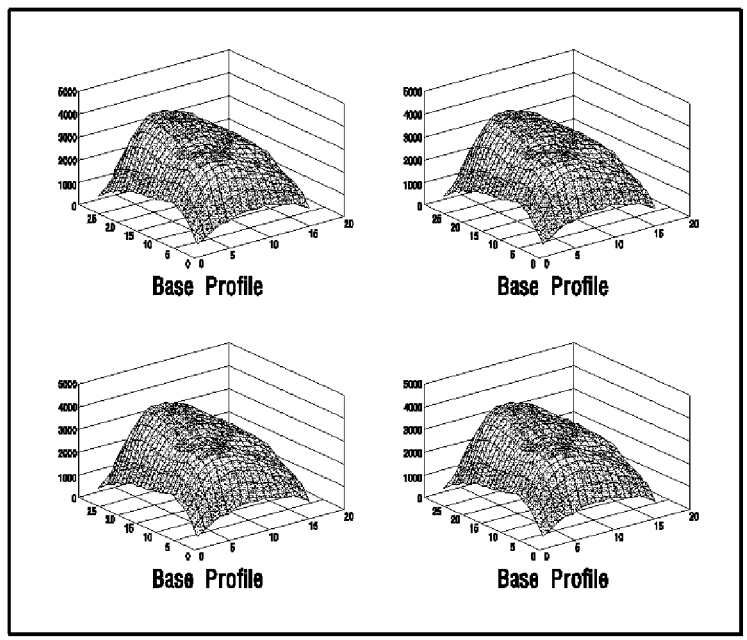
Profile Extraction
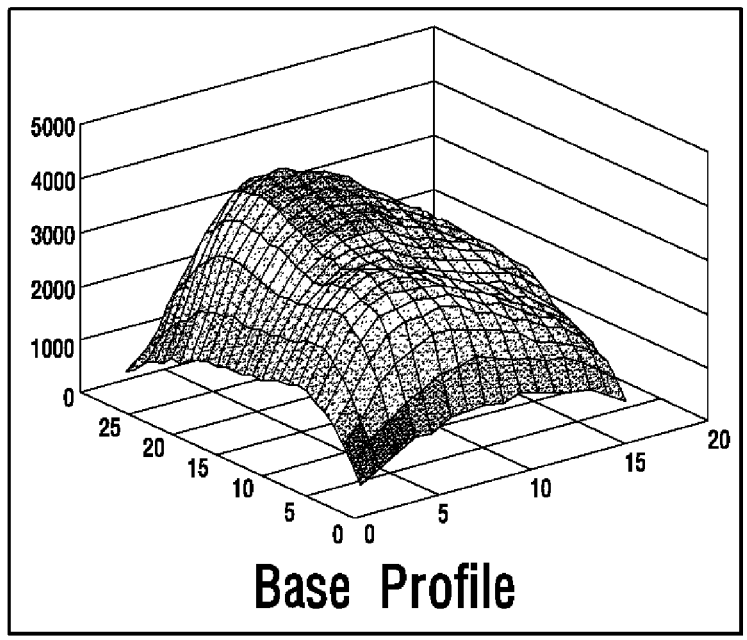

[Fig. 9]
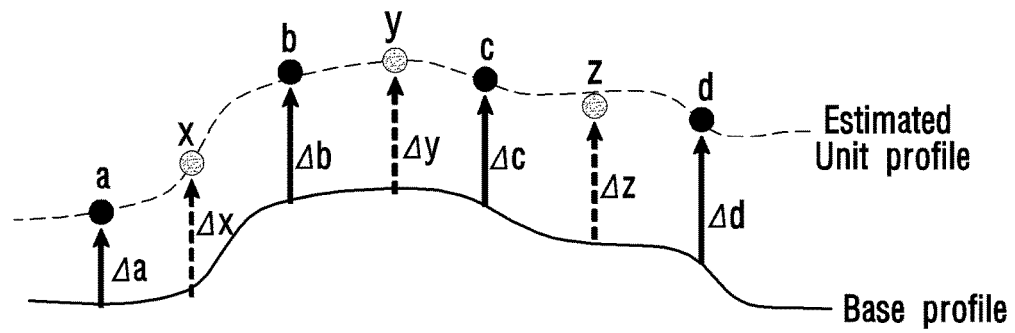
[Fig. 10]
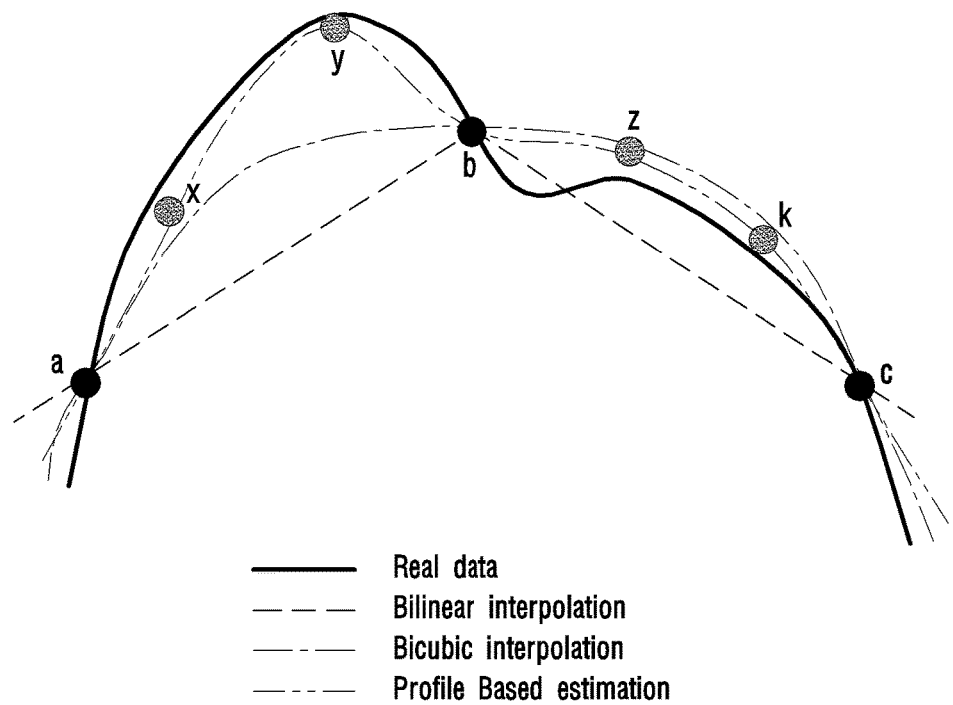

[Fig. 11a]
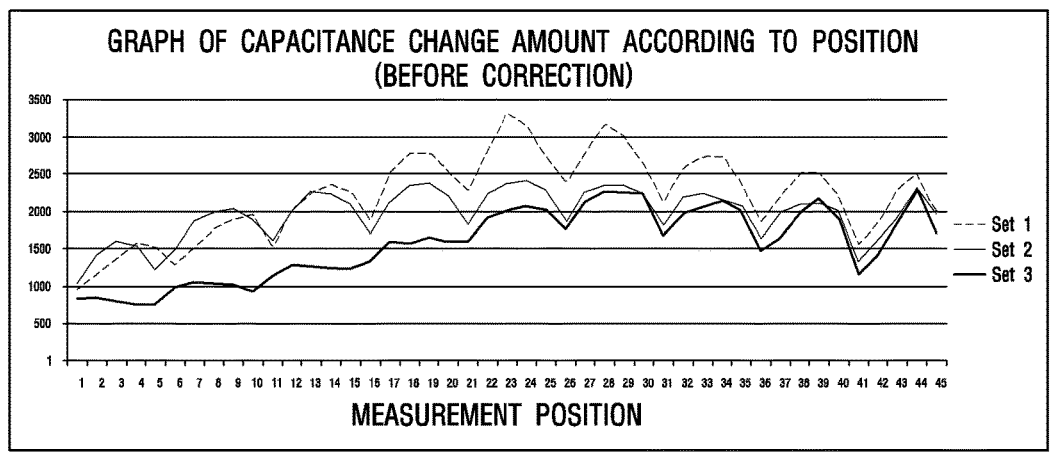

【Fig. 11b】

| Set 1 | A | B | C | D | E |
|---|---|---|---|---|---|
| 1 | 962 | 1165 | 1358 | 1573 | 1528 |
| 2 | 1281 | 1522 | 1770 | 1890 | 1946 |
| 3 | 1551 | 2025 | 2242 | 2349 | 2245 |
| 4 | 1883 | 2516 | 2772 | 2784 | 2541 |
| 5 | 2284 | 2827 | 3318 | 3143 | 2713 |
| 6 | 2395 | 2794 | 3184 | 3024 | 2649 |
| 7 | 2151 | 2598 | 2739 | 2742 | 2409 |
| 8 | 1883 | 2240 | 2523 | 2532 | 2226 |
| 9 | 1588 | 1866 | 2319 | 2527 | 1989 |

| Set 2 | A | B | C | D | E |
|---|---|---|---|---|---|
| 1 | 1041 | 1418 | 1595 | 1535 | 1217 |
| 2 | 1494 | 1887 | 1990 | 2014 | 1876 |
| 3 | 1609 | 2010 | 2260 | 2230 | 2093 |
| 4 | 1696 | 2128 | 2355 | 2374 | 2198 |
| 5 | 1811 | 2242 | 2373 | 2411 | 2289 |
| 6 | 1861 | 2265 | 2347 | 2352 | 2220 |
| 7 | 1815 | 2193 | 2225 | 2133 | 2073 |
| 8 | 1625 | 1968 | 2075 | 2100 | 2010 |
| 9 | 1329 | 1593 | 1907 | 2308 | 1960 |

| Set 3 | A | B | C | D | E |
|---|---|---|---|---|---|
| 1 | 824 | 835 | 784 | 745 | 751 |
| 2 | 972 | 1038 | 1008 | 1007 | 939 |
| 3 | 1138 | 1286 | 1277 | 1240 | 1240 |
| 4 | 1334 | 1599 | 1573 | 1643 | 1592 |
| 5 | 1595 | 1917 | 2009 | 2060 | 2016 |
| 6 | 1760 | 2124 | 2262 | 2257 | 2235 |
| 7 | 1680 | 1965 | 2061 | 2124 | 2002 |
| 8 | 1481 | 1646 | 1979 | 2160 | 1898 |
| 9 | 1150 | 1424 | 1859 | 2299 | 1700 |

[Fig. 12a]
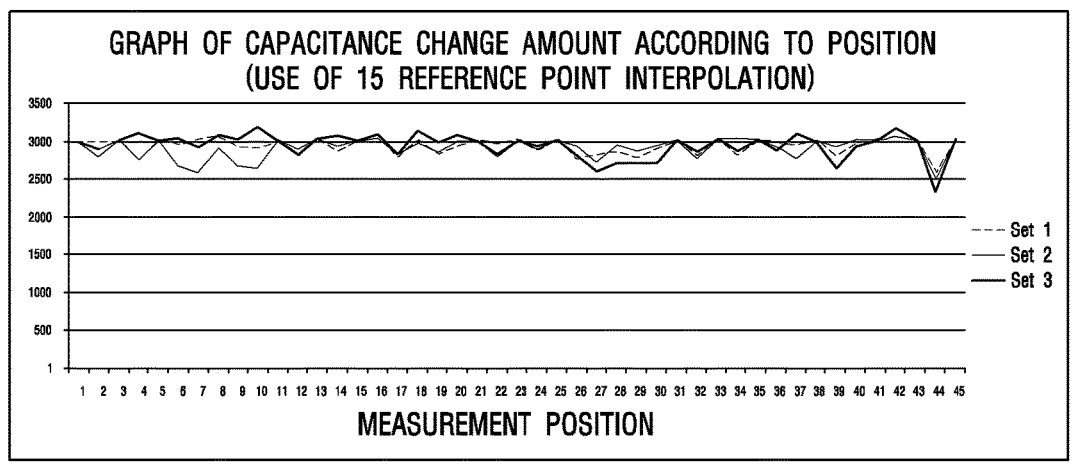

【Fig. 12b】

| Set 1 | A | B | C | D | E |
|---|---|---|---|---|---|
| 1 | 3000 | 2987.1245 | 3000 | 2752.0661 | 3000 |
| 2 | 2942.623 | 3012.3193 | 3050.7475 | 2925.7937 | 2908.2734 |
| 3 | 3000 | 2809.6296 | 3000 | 2865.2618 | 3000 |
| 4 | 3054.9655 | 2800.5763 | 3008.658 | 2833.5129 | 2926.8005 |
| 5 | 3000 | 2972.4089 | 3000 | 2878.301 | 3000 |
| 6 | 2777.6618 | 2816.3923 | 2853.4862 | 2772.5694 | 2900.3398 |
| 7 | 3000 | 2823.3256 | 3000 | 2816.1926 | 3000 |
| 8 | 2978.4918 | 2945.4241 | 3007.1344 | 2800.9479 | 2963.6119 |
| 9 | 3000 | 3140.6752 | 3000 | 2557.1824 | 3000 |

| Set 2 | A | B | C | D | E |
|---|---|---|---|---|---|
| 1 | 3000 | 2788.4344 | 3000 | 2747.8827 | 3000 |
| 2 | 2660.6426 | 2585.4531 | 2905.7789 | 2668.1976 | 2646.5885 |
| 3 | 3000 | 2887.3134 | 3000 | 2928.0269 | 3000 |
| 4 | 3024.7642 | 2838.2284 | 2950.9554 | 2848.0413 | 2990.4459 |
| 5 | 3000 | 2799.2864 | 3000 | 2900.4562 | 3000 |
| 6 | 2922.6222 | 2723.1788 | 2938.6451 | 2857.1429 | 29147.2973 |
| 7 | 3000 | 2763.3379 | 3000 | 3022.5035 | 3000 |
| 8 | 2902.1538 | 2772.8659 | 2986.988 | 2916.0714 | 3009.7015 |
| 9 | 3000 | 3047.081 | 3000 | 2513.2149 | 3000 |

| Set 3 | A | B | C | D | E |
|---|---|---|---|---|---|
| 1 | 3000 | 2888.6228 | 3000 | 3090.604 | 3000 |
| 2 | 3027.7778 | 2906.7919 | 3066.9643 | 3017.8749 | 3180.5112 |
| 3 | 3000 | 2816.874 | 3000 | 3044.7581 | 3000 |
| 4 | 3073.0885 | 2823.1707 | 3133.5029 | 2986.3055 | 3067.8392 |
| 5 | 3000 | 2820.0313 | 3000 | 2930.8252 | 3000 |
| 6 | 2791.1932 | 2593.5734 | 2698.939 | 2687.6385 | 2696.6443 |
| 7 | 3000 | 2855.7252 | 3000 | 2869.3053 | 3000 |
| 8 | 2866.3065 | 3075.6379 | 2971.1976 | 2646.5278 | 2925.7113 |
| 9 | 3000 | 3169.5927 | 3000 | 2322.0966 | 3000 |

[Fig. 13a]
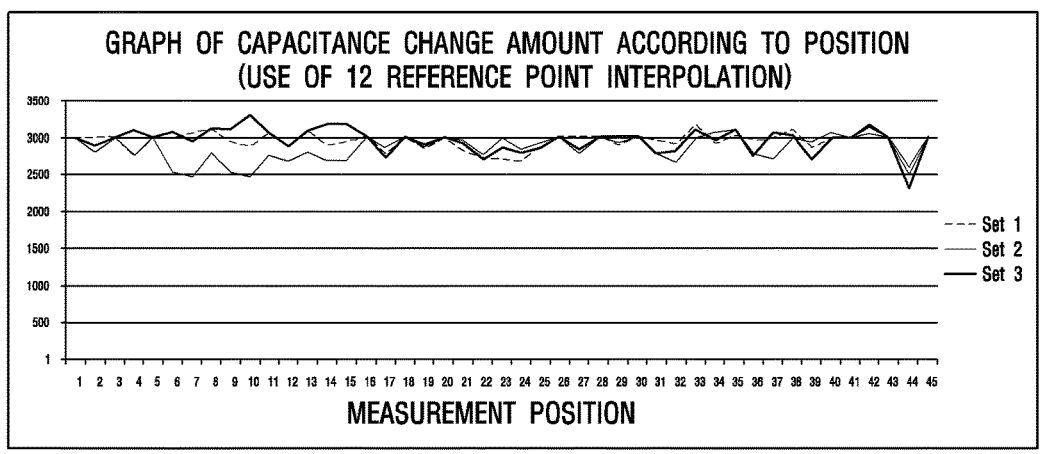

[Fig. 13b]

| Set 1 | A | B | C | D | E |
|---|---|---|---|---|---|
| 1 | 3000 | 2987.1245 | 3000 | 2752.0661 | 3000 |
| 2 | 2971.897 | 3053.548 | 3100.565 | 2932.5397 | 2876.1562 |
| 3 | 3048.3559 | 2871.6049 | 3078.5013 | 2876.1175 | 2944.3207 |
| 4 | 3000 | 2775.2385 | 3000 | 2862.6078 | 3000 |
| 5 | 2809.5447 | 2715.069 | 2692.5859 | 2659.72 | 2869.5171 |
| 6 | 3000 | 2995.1682 | 3000 | 2893.3532 | 3000 |
| 7 | 2965.1325 | 2899.3457 | 3171.5955 | 2912.8373 | 3024.9066 |
| 8 | 2958.5767 | 2989.5089 | 3100.2774 | 2853.278 | 2977.0889 |
| 9 | 3000 | 3140.6752 | 3000 | 2557.1824 | 3000 |

| Set 2 | A | B | C | D | E |
|---|---|---|---|---|---|
| 1 | 3000 | 2788.4344 | 3000 | 2747.8827 | 3000 |
| 2 | 2528.7818 | 2470.3233 | 2786.4322 | 2526.5641 | 2469.0832 |
| 3 | 2755.1274 | 2671.1443 | 2789.823 | 2672.1973 | 2681.7965 |
| 4 | 3000 | 2855.4981 | 3000 | 2876.7902 | 3000 |
| 5 | 2946.1623 | 2762.8234 | 2972.1871 | 2836.9971 | 2895.1507 |
| 6 | 3000 | 2786.755 | 3000 | 2912.6272 | 3000 |
| 7 | 2782.9201 | 2656.6347 | 2966.7416 | 3047.5856 | 3087.3131 |
| 8 | 2780.9231 | 2713.4146 | 2969.1566 | 2928.8095 | 3054.7264 |
| 9 | 3000 | 3047.081 | 3000 | 2513.2149 | 3000 |

| Set 3 | A | B | C | D | E |
|---|---|---|---|---|---|
| 1 | 3000 | 2888.6228 | 3000 | 3090.604 | 3000 |
| 2 | 3067.9012 | 2949.422 | 3116.0714 | 3095.8292 | 3294.9947 |
| 3 | 3068.5413 | 2885.6921 | 3077.5255 | 3171.371 | 3173.3871 |
| 4 | 3000 | 2727.0169 | 3000 | 2889.5313 | 3000 |
| 5 | 2909.7179 | 2710.8764 | 2863.3649 | 2789.5631 | 2847.4702 |
| 6 | 3000 | 2840.8764 | 3000 | 2988.7018 | 3000 |
| 7 | 2779.7619 | 2812.4682 | 3097.0403 | 2955.0377 | 3081.9181 |
| 8 | 2741.391 | 3049.8177 | 3021.7281 | 2688.6574 | 2968.9146 |
| 9 | 3000 | 3169.5927 | 3000 | 2322.0966 | 3000 |

【Fig. 14】
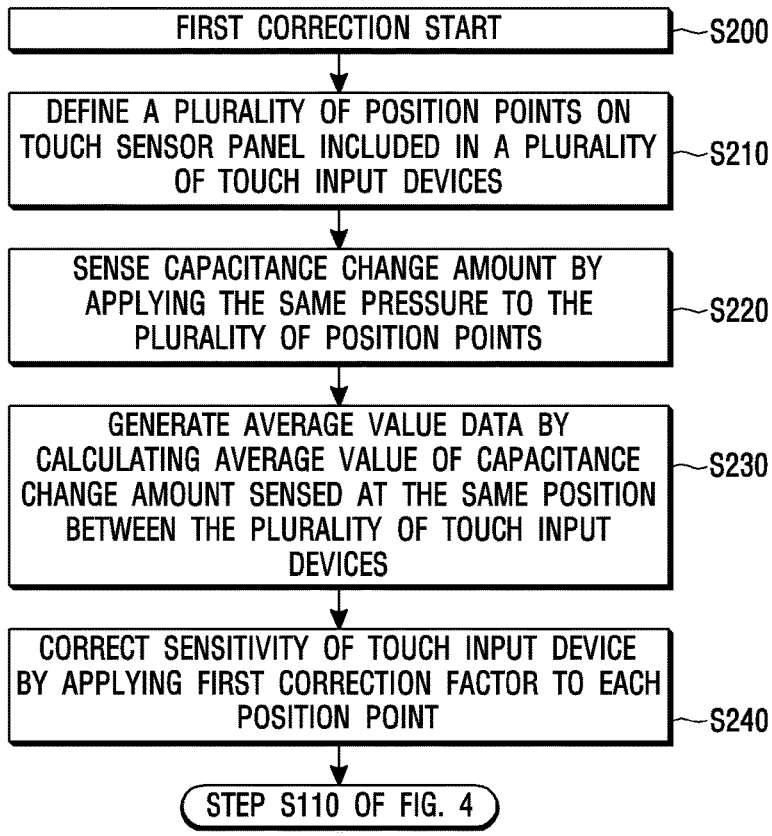
【Fig. 15a】
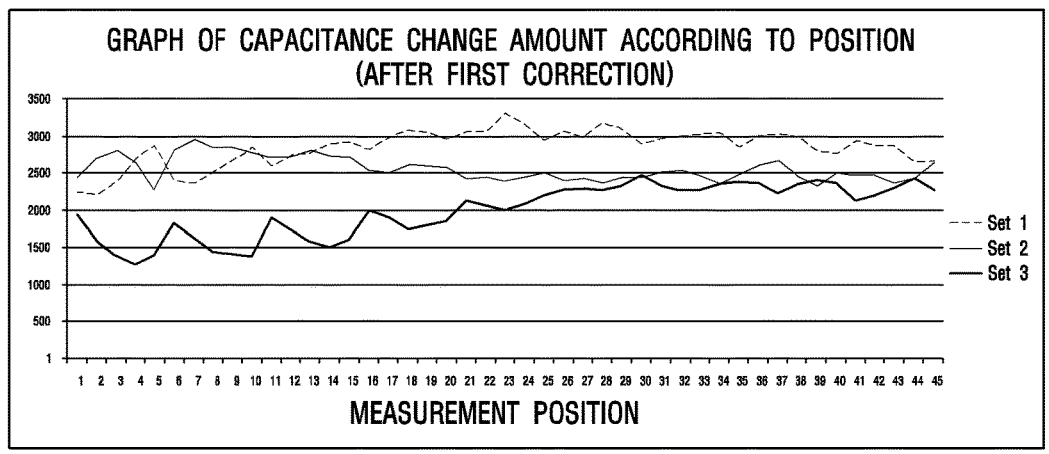

【Fig. 15b】

| Set 1 | A | B | C | D | E |
|---|---|---|---|---|---|
| 1 | 2236.8003 | 2206.3629 | 2382.3688 | 2693.6988 | 2857.7468 |
| 2 | 2402.9513 | 2368.2103 | 2530.3344 | 2659.1276 | 2852.5623 |
| 3 | 2599.7492 | 2731.2626 | 2769.2862 | 2880.5569 | 2900.6578 |
| 4 | 2813.5784 | 2979.1694 | 3069.5783 | 3036.3491 | 2961.6505 |
| 5 | 3038.9813 | 3070.2485 | 3318 | 3168.5452 | 2950.5857 |
| 6 | 3072.7321 | 2993.9546 | 3193.217 | 3111.0104 | 2900.1311 |
| 7 | 2972.2317 | 2991.9883 | 3024.0366 | 3027.6815 | 2849.4494 |
| 8 | 2994.3813 | 3022.0599 | 2987.8101 | 2795.4949 | 2763.1112 |
| 9 | 2942.2122 | 2879.5365 | 2871.6918 | 2669.1305 | 2653.1143 |

| Set 2 | A | B | C | D | E |
|---|---|---|---|---|---|
| 1 | 2420.4876 | 2685.5129 | 2798.143 | 2628.6254 | 2276.0981 |
| 2 | 2802.5052 | 2936.1451 | 2844.8392 | 2833.5889 | 2749.9521 |
| 3 | 2696.9675 | 2711.031 | 2791.5195 | 2734.6283 | 2704.2658 |
| 4 | 2534.163 | 2519.7426 | 2607.8127 | 2589.1856 | 2561.8684 |
| 5 | 2409.6301 | 2434.9123 | 2373 | 2430.5957 | 2489.4548 |
| 6 | 2387.6219 | 2427.0963 | 2353.7941 | 2419.6748 | 2430.4609 |
| 7 | 2507.9501 | 2525.5698 | 2456.5467 | 2355.2315 | 2452.0168 |
| 8 | 2584.1049 | 2655.0955 | 2457.2755 | 2318.5385 | 2494.9926 |
| 9 | 2462.3426 | 2458.2538 | 2361.4991 | 2437.8129 | 2614.461 |

| Set 3 | A | B | C | D | E |
|---|---|---|---|---|---|
| 1 | 1915.9287 | 1581.3845 | 1375.3882 | 1275.7823 | 1104.5601 |
| 2 | 1823.3167 | 1615.1132 | 1441.004 | 1416.7944 | 1376.4419 |
| 3 | 1907.4885 | 1734.5203 | 1577.3321 | 1520.6005 | 1602.1451 |
| 4 | 1993.2626 | 1893.3592 | 1741.8639 | 1791.9259 | 1855.548 |
| 5 | 2122.2308 | 2081.9478 | 2009 | 2076.7429 | 2192.5473 |
| 6 | 2258.0411 | 2276.0055 | 2268.548 | 2321.9413 | 2466.883 |
| 7 | 2355.1135 | 2262.9935 | 2275.4799 | 2345.2938 | 2368.0356 |
| 8 | 2355.1135 | 2220.6740 | 2343.5895 | 2384.7824 | 2355.9681 |
| 9 | 2130.6952 | 2197.4598 | 2302.0591 | 2428.3067 | 2267.6447 |

【Fig. 16a】
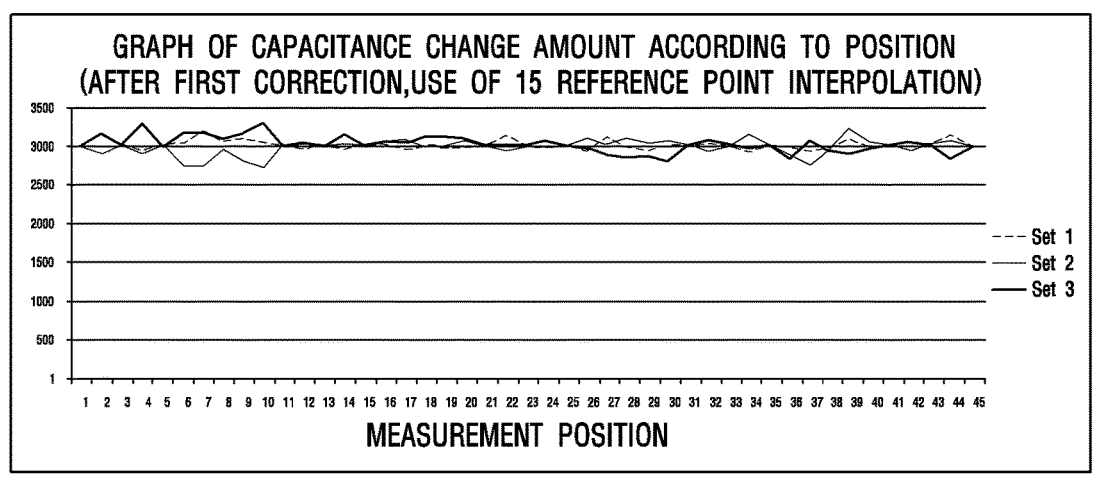

【Fig. 16b】

| Set 1 | A | B | C | D | E |
|---|---|---|---|---|---|
| 1 | 3000 | 3140.3509 | 3000 | 2917.9852 | 3000 |
| 2 | 3019.1308 | 3163.2129 | 3053.9373 | 3077.1539 | 3028.0169 |
| 3 | 3000 | 2948.6558 | 3000 | 2952.5249 | 3000 |
| 4 | 3006.1703 | 2952.0016 | 2974.6527 | 5948.9024 | 2963.5048 |
| 5 | 3000 | 3105.7655 | 3000 | 2967.5697 | 3000 |
| 6 | 2934.4633 | 3094.5484 | 2979.1445 | 2927.2013 | 2999.8826 |
| 7 | 3000 | 3006.1623 | 3000 | 2909.8929 | 3000 |
| 8 | 2962.771 | 2930.9906 | 2959.8911 | 3058.0422 | 2987.1728 |
| 9 | 3000 | 3028.5625 | 3000 | 3104.8517 | 3000 |

| Set 2 | A | B | C | D | E |
|---|---|---|---|---|---|
| 1 | 3000 | 2914.8793 | 3000 | 2895.5673 | 3000 |
| 2 | 2739.0431 | 2734.9936 | 2947.2646 | 2797.6959 | 2716.6094 |
| 3 | 3000 | 3036.7526 | 3000 | 3014.5515 | 3000 |
| 4 | 3022.6534 | 3057.1924 | 2970.6041 | 3000.4338 | 3040.9762 |
| 5 | 3000 | 2946.2848 | 3000 | 3000.7796 | 3000 |
| 6 | 3089.4215 | 3011.9716 | 3077.7204 | 3028.6151 | 3049.7126 |
| 7 | 3000 | 2948.5406 | 3000 | 3012.1663 | 3000 |
| 8 | 2885.1146 | 2764.9679 | 2941.0901 | 3197.4422 | 3045.9877 |
| 9 | 3000 | 2943.4562 | 3000 | 3061.7363 | 3000 |

| Set 3 | A | B | C | D | E |
|---|---|---|---|---|---|
| 1 | 3000 | 3121.9322 | 3000 | 3268.5218 | 3000 |
| 2 | 3145.436 | 3146.5925 | 3073.6073 | 3154.7054 | 3276.6059 |
| 3 | 3000 | 3013.6463 | 3000 | 3136.4028 | 3000 |
| 4 | 3032.505 | 3016.8805 | 3088.3573 | 3089.2842 | 3067.5781 |
| 5 | 3000 | 2976.4657 | 3000 | 3034.7141 | 3000 |
| 6 | 2951.8766 | 2876.1306 | 2832.9662 | 2857.0046 | 2795.7505 |
| 7 | 3000 | 3046.9961 | 3000 | 2969.8937 | 3000 |
| 8 | 2835.5981 | 3049.6285 | 2929.8256 | 2897.5031 | 2951.4493 |
| 9 | 3000 | 3025.8263 | 3000 | 2822.7719 | 3000 |

[Fig. 17a]
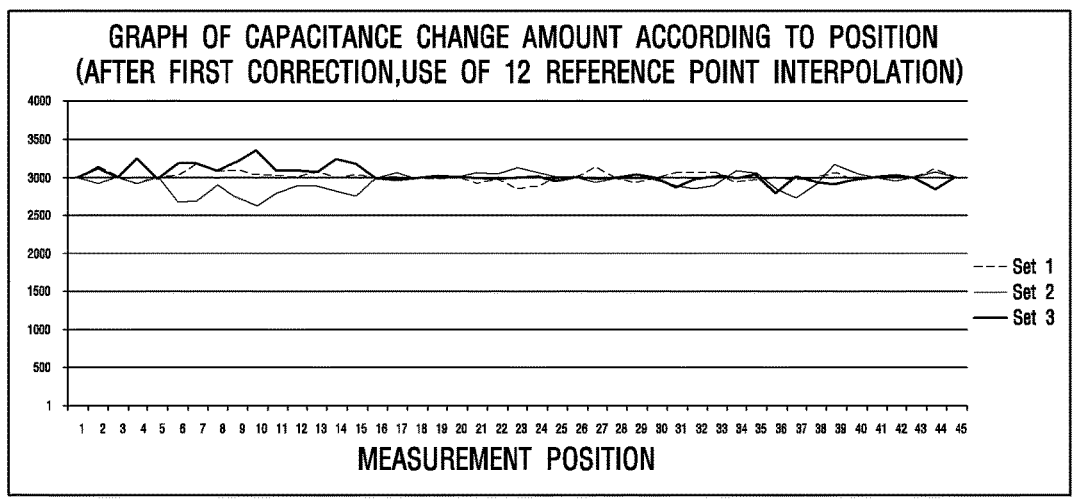

【Fig. 17b】

| Set 1 | A | B | C | D | E |
|---|---|---|---|---|---|
| 1 | 3000 | 3140.3509 | 3000 | 2917.9852 | 3000 |
| 2 | 3032.5954 | 3192.5996 | 3096.1583 | 3104.6762 | 3041.8772 |
| 3 | 3024.8906 | 2999.6168 | 3077.1559 | 3003.3382 | 3027.2608 |
| 4 | 3000 | 2962.1461 | 3000 | 2979.5135 | 3000 |
| 5 | 2905.4031 | 2967.7823 | 2831.2818 | 2869.9079 | 2979.9752 |
| 6 | 3000 | 3139.3007 | 3000 | 3937.9593 | 3000 |
| 7 | 3057.5262 | 3065.8212 | 3061.5125 | 2924.9332 | 2966.6807 |
| 8 | 2991.3213 | 2960.5233 | 2991.0203 | 3066.187 | 2969.9926 |
| 9 | 3000 | 3028.5625 | 3000 | 3014.8517 | 3000 |

| Set 2 | A | B | C | D | E |
|---|---|---|---|---|---|
| 1 | 3000 | 2914.8793 | 3000 | 2895.5673 | 3000 |
| 2 | 2631.6234 | 2653.0087 | 2883.8532 | 2702.9615 | 2586.9776 |
| 3 | 2776.7534 | 2859.1672 | 2870.7549 | 2818.2264 | 2736.3564 |
| 4 | 3000 | 3061.0125 | 3000 | 2994.9656 | 3000 |
| 5 | 3063.8218 | 3044.2754 | 3136.2875 | 3071.4495 | 3008.086 |
| 6 | 3000 | 2930.3015 | 3000 | 2965.8459 | 3000 |
| 7 | 2885.8574 | 2832.3655 | 2877.6523 | 3087.6944 | 3048.667 |
| 8 | 2829.7253 | 2709.7141 | 2879.9344 | 3177.9018 | 3069.9021 |
| 9 | 3000 | 2832.3655 | 3000 | 3061.7363 | 3000 |

| Set 3 | A | B | C | D | E |
|---|---|---|---|---|---|
| 1 | 3000 | 3121.9322 | 3000 | 3268.5218 | 3000 |
| 2 | 3194.7934 | 3194.1291 | 3117.7153 | 3231.6998 | 3388.9321 |
| 3 | 3094.3589 | 3102.1746 | 3080.5916 | 3279.8792 | 3193.0044 |
| 4 | 3000 | 2959.1267 | 3000 | 3011.3511 | 3000 |
| 5 | 3004.836 | 2976.197 | 2994.3344 | 3002.1203 | 2943.4469 |
| 6 | 3000 | 2983.2457 | 3000 | 3046.221 | 3000 |
| 7 | 2863.2522 | 2979.6667 | 3005.588 | 2984.8213 | 3024.199 |
| 8 | 2768.2027 | 3015.3223 | 2932.5385 | 2904.8433 | 2963.6107 |
| 9 | 3000 | 3025.8263 | 3000 | 2822.7719 | 3000 |

TOUCH PRESSURE SENSITIVITY CORRECTION METHOD AND COMPUTER-READABLE RECORDING MEDIUM

CROSS-REFERENCE TO RELATED APPLICATIONS

This application is a U.S. national stage application under 35 U.S.C. § 371 of PCT Application No. PCT/KR2016/005563, filed May 26, 2016, which claims priority Korean Patent Application No. 10-2015-0104985, filed Jul. 24, 2015, the entireties of which are incorporated herein by reference.

BACKGROUND

Field

The present disclosure relates to a touch pressure sensitivity correction method and a computer-readable recording medium.

Description of the Related Art

Various kinds of input devices for operating a computing system, for example, a button, key, joystick and touch screen, etc., are being developed and used. The touch screen has a variety of advantages, e.g., ease of operation, miniaturization of products and simplification of the manufacturing process, the most attention is paid to the touch screen.

The touch screen may constitute a touch surface of a touch input device including a touch sensor panel which may be a transparent panel including a touch-sensitive surface. The touch sensor panel is attached to the front side of the touch screen, and then the touch-sensitive surface may cover the touch screen. The touch screen allows a user to operate the computing system by touching the touch screen with his/her finger, etc. Accordingly, the computing system recognizes whether or not the touch has occurred on the touch screen and a touch position on the touch screen and performs arithmetic operations, thereby performing actions according to the user's intention.

Meanwhile, there is a requirement for a device for sensing even the touch pressure for convenience of operation and a research on the device is being conducted. However, in the sensing of the touch pressure, there is a problem that the touch pressure cannot be sensed with a uniform sensitivity on the display surface. Furthermore, due to the difference in the manufacturing process or manufacturing environment, different sensitivities may be shown for each manufactured product. For the purpose of correcting this, therefore, the touch input device needs to correct the sensitivity.

SUMMARY

One embodiment is a touch pressure sensitivity correction method. The method includes: defining a plurality of reference points on a touch sensor panel; generating a reference data for a capacitance change amount sensed by applying the same pressure to the plurality of reference points; generating an interpolated data corresponding to a capacitance change amount for a random point located between the plurality of reference points; calculating, on the basis of the reference data and interpolated data, for each of the reference points and the random point, a correction factor for correcting a touch pressure sensitivity of a touch input device to a target value; and correcting uniformly the touch pressure sensitivity of the touch input device by applying the calculated correction factor to each corresponding point. In the generating an interpolated data, the interpolated data corresponding to the capacitance change amount for the random point is generated based on the reference data and a spaced distance from the plurality of reference points.

The correction factor may correspond to a value obtained by dividing the target value by the capacitance change amount recorded in the reference data and in the interpolated data and may be calculated for each of the reference points and the random point.

In the defining the reference point, the reference point is located at an intersection of n number of horizontal lines parallel to each other and m number of vertical lines parallel to each other on the touch sensor panel, so that n×m (n and m are natural numbers equal to or greater than 2) number of the reference points may be defined.

Another embodiment is a touch pressure sensitivity correction method. The method includes: defining a plurality of reference points on a touch sensor panel; generating a reference data for a capacitance change amount sensed by applying the same pressure to the plurality of reference points; generating an interpolated data corresponding to a capacitance change amount for a random point located between the plurality of reference points; calculating, on the basis of the reference data and interpolated data, for each of the reference points and the random point, a correction factor for correcting a touch pressure sensitivity of a touch input device to a target value; and correcting uniformly the touch pressure sensitivity of the touch input device by applying the calculated correction factor to each corresponding point. In the generating an interpolated data, a function based on the reference data and coordinates of the plurality of reference points is generated, and a coordinate of the random point is substituted into the function, so that the interpolated data corresponding to the capacitance change amount for the random point is calculated.

The correction factor may correspond to a value obtained by dividing the target value by the capacitance change amount recorded in the reference data and in the interpolated data and may be calculated for each of the reference points and the random point.

In the defining the reference point, the reference point is located at an intersection of n number of horizontal lines parallel to each other and m number of vertical lines parallel to each other on the touch sensor panel, so that n×m (n and m are natural numbers equal to or greater than 2) number of the reference points may be defined.

Further another embodiment is a touch pressure sensitivity correction method. The method includes: defining a plurality of reference points on a touch sensor panel; generating a reference data for a capacitance change amount sensed by applying the same pressure to the plurality of reference points; generating an interpolated data corresponding to a capacitance change amount for a random point located between the plurality of reference points; calculating, on the basis of the reference data and interpolated data, for each of the reference points and the random point, a correction factor for correcting a touch pressure sensitivity of a touch input device to a target value; and correcting uniformly the touch pressure sensitivity of the touch input device by applying the calculated correction factor to each corresponding point. The generating an interpolated data includes: creating a base profile on the basis of two or more profiles of the capacitance change amount; generating a delta data by calculating, from the base profile, a deviation between the reference data and the capacitance change amount corresponding to coordinates of the plurality of reference points; and calculating the capacitance change amount for the random point on the basis of the delta data.

The profile may be a data recording the capacitance change amount detected by applying the same pressure to a plurality of coordinates, with respect to a plurality of the touch input devices manufactured in the same process.

In the generating an interpolated data, the interpolated may be generated by calculating the capacitance change amount for the random point, on the basis of the delta data and a spaced distance from the plurality of reference points.

In the generating an interpolated data, a function based on the delta data and coordinates of the plurality of reference points is generated, and a coordinate of the random point is substituted into the function, so that the interpolated data corresponding to the capacitance change amount for the random point may be calculated.

A computer-readable recording medium according to the embodiment of the present invention may record a program performing the above-described touch pressure sensitivity correction method.

BRIEF DESCRIPTION OF THE DRAWINGS

FIG. 1 is a schematic view showing a configuration of a touch input device to which a touch pressure sensitivity correction method of an embodiment of the present invention is applied;

FIG. 2 is a cross sectional view of the touch input device configured to detect a touch position and a touch pressure, to which the touch pressure sensitivity correction method according to the embodiment of the present invention is applied;

FIG. 3a is a graph showing a capacitance change amount which is sensed when the same pressure is applied to each position of a touch sensor panel;

FIG. 3b is a graph showing a preferable capacitance change amount;

FIG. 4 is a flowchart showing the touch pressure sensitivity correction method according to the embodiment of the present invention;

FIGS. 5a and 5b are views showing an embodiment of a reference point defined in the touch pressure sensitivity correction method according to the embodiment of the present invention;

FIG. 6 is a view for describing an embodiment where an interpolated data is generated in the touch pressure sensitivity correction method according to the embodiment of the present invention;

FIG. 7 is a view for describing an embodiment where an interpolated data is generated in the touch pressure sensitivity correction method according to the embodiment of the present invention;

FIG. 8 is a view for describing an embodiment where a base profile is created in the touch pressure sensitivity correction method according to the embodiment of the present invention;

FIG. 9 is a view for describing an embodiment where a delta data is generated in the touch pressure sensitivity correction method according to the embodiment of the present invention;

FIG. 10 is a graph showing effects of a profile-based interpolated data generation in the touch pressure sensitivity correction method according to the embodiment of the present invention;

FIG. 11a is a graph showing a capacitance change amount sensed by applying the same pressure to a plurality of position points;

FIG. 11b is a data showing the capacitance change amount sensed by applying the same pressure to the plurality of position points;

FIG. 12a is a graph showing a result obtained by applying the touch pressure sensitivity correction method according to the embodiment of the present invention;

FIG. 12b is a data showing a result obtained by applying the touch pressure sensitivity correction method according to the embodiment of the present invention;

FIG. 13a is a graph showing a result obtained by applying the touch pressure sensitivity correction method according to the embodiment of the present invention;

FIG. 13b is a data showing a result obtained by applying the touch pressure sensitivity correction method according to the embodiment of the present invention;

FIG. 14 is a flowchart showing a first correction step which is applied to the touch pressure sensitivity correction method according to the embodiment of the present invention;

FIG. 15a is a graph showing a result obtained by applying the first correction step in the touch pressure sensitivity correction method according to the embodiment of the present invention;

FIG. 15b is a data showing a result obtained by applying the first correction step in the touch pressure sensitivity correction method according to the embodiment of the present invention;

FIG. 16a is a graph showing a result obtained by applying a practical correction step after the first correction step in the touch pressure sensitivity correction method according to the embodiment of the present invention;

FIG. 16b is a data showing a result obtained by applying a practical correction step after the first correction step in the touch pressure sensitivity correction method according to the embodiment of the present invention;

FIG. 17a is a graph showing a result obtained by applying a practical correction step after the first correction step in the touch pressure sensitivity correction method according to the embodiment of the present invention; and FIG. 17b is a data showing a result obtained by applying a practical correction step after the first correction step in the touch pressure sensitivity correction method according to the embodiment of the present invention.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

FIG. 1 is a schematic view showing a configuration of a touch input device to which a touch pressure sensitivity correction method of an embodiment of the present invention is applied.

Referring to FIG. 1, a touch sensor panel 100 according to the embodiment of the present invention may include a plurality of drive electrodes TX1 to TXn and a plurality of receiving electrodes RX1 to RXm. The touch sensor panel 100 may include a drive unit 120 which applies a drive signal to the plurality of drive electrodes TX1 to TXn for the purpose of the operation of the touch sensor panel 100, and a sensing unit 110 which detects whether the touch has occurred or not and a touch position by receiving a sensing signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitudes of the values may be different from each other.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment which is one component of the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may include at least any one of silver ink, copper, and carbon nanotube (CNT). Also, the drive electrode TX and the receiving electrode RX may be made of metal mesh or nano silver.

The drive unit 120 which is one component of the touch input device 1000 to which the touch pressure sensitivity correction method according to the embodiment is applied may apply a drive signal to the drive electrodes TX1 to TXn. In the touch input device 1000 to which the touch pressure sensitivity correction method according to the embodiment is applied, one drive signal may be sequentially applied at a time to the first drive electrode TX1 to the n-th drive electrode TXn. The drive signal may be applied again repeatedly. This is only an example. The drive signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the drive signal has been applied, thereby detecting whether or not the touch has occurred and the touch position. For example, the sensing signal may be a signal coupled by the capacitance (Cm) 101 generated between the receiving electrode RX and the drive electrode TX to which the drive signal has been applied.

As such, the process of sensing the drive signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 120 and the sensing unit 110. For example, the controller 130 generates and transmits a drive control signal to the drive unit 120, so that the drive signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not shown) capable of detecting whether or not the touch has occurred on the touch sensor panel 100 of the touch input device 1000 and the touch position. The touch input device 1000 to which the touch pressure sensitivity correction method according to the embodiment is applied may further include the controller 130. In the embodiment of the present invention, the touch detection device according to the embodiment may be integrated and implemented on a touch sensing integrated circuit (IC) in a touch input device 1000 including the touch sensor panel 100. The drive electrode TX and the receiving electrode RX included in the touch sensor panel 100 may be connected to the drive unit 120 and the sensing unit 110 included in the touch sensing IC 150 through, for example, a conductive trace and/or a conductive pattern printed on a circuit board, or the like.

As described above, a capacitance (C) with a predetermined value is generated at each crossing of the drive electrode TX and the receiving electrode RX. When an object such as finger approaches close to the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 or not and the touch position. For example, the sensing unit 110 is able to sense whether the touch has occurred on the surface of the touch sensor panel 100 comprised of a two-dimensional plane consisting of a first axis and a second axis and/or the touch position.

More specifically, when the touch occurs on the touch sensor panel 100, the drive electrode TX to which the drive signal has been applied is detected, so that the position of the second axial direction of the touch can be detected. Likewise, when the touch occurs on the touch sensor panel 100, a capacitance change is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000, the touch sensor panel 100 for detecting whether or not the touch has occurred and the touch position may be implemented by using not only the above-described method but also any touch sensing method like a self-capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

In the touch input device 1000 to which the touch pressure sensitivity correction method according to the embodiment is applied, the touch sensor panel 100 for detecting the touch position may be positioned outside or inside a display module 200.

The display module 200 of the touch input device 1000 may be a liquid crystal display (LCD). Here, the display module 200 may have any one of an In Plane Switching (IPS) type, a Vertical Alignment (VA) type, and a Twisted Nematic (TN) type. Also, the display module 200 of the touch input device 1000 may be a display panel included in a plasma display panel (PDP), an organic light emitting diode (OLED), etc. Accordingly, a user may perform the input operation by touching the touch surface while visually identifying an image displayed on the display panel.

Here, the display module 200 may include a control circuit which receives an input from an application processor (AP) or a central processing unit (CPU) on a main board for the operation of the touch input device 1000 and displays the contents that the user wants on the display panel.

Here, the control circuit for the operation of the display panel 200 may include a display panel control IC, a graphic controller IC, and other circuits required to operate the display panel 200.

FIG. 2 is a cross sectional view of the touch input device configured to detect the touch position and the touch pressure, to which the touch pressure sensitivity correction method according to the embodiment of the present invention is applied.

In the touch input device 1000 including the display module 200, a pressure detection module 400 and the touch sensor panel 100 which detects the touch position may be attached to the front side of the display module 200. Accordingly, it is possible to protect a display screen of the display module 200 and to increase a touch detection sensitivity of the touch sensor panel 100.

Here, the pressure detection module 400 may operate separately from the touch sensor panel 100 which detects the touch position. For example, the pressure detection module 400 may detect only the pressure independently of the touch sensor panel 100 which detects the touch position. Also, the pressure detection module 400 may be configured to be coupled to the touch sensor panel 100 which detects the touch position and to detect the touch pressure. For example, at least one of the drive electrode TX and the receiving electrode RX included in the touch sensor panel 100 which detects the touch position may be used to detect the touch pressure.

FIG. 2 shows that the pressure detection module 400 is coupled to the touch sensor panel 100 and detects the touch pressure. In FIG. 2, the pressure detection module 400 includes a spacer layer 420 which leaves a space between the touch sensor panel 100 and the display module 200. The pressure detection module 400 may include a reference potential layer spaced from the touch sensor panel 100 by the spacer layer 420. Here, the display module 200 may function as the reference potential layer.

The reference potential layer may have any potential which causes the change of the capacitance 101 generated between the drive electrode TX and the receiving electrode RX. For instance, the reference potential layer may be a ground layer having a ground potential. The reference potential layer may be the ground layer of the display module 200. Here, the reference potential layer may have a parallel plane with the two-dimensional plane of the touch sensor panel 100.

As shown in FIG. 2, the touch sensor panel 100 is disposed apart from the display module 200, i.e., the reference potential layer. Here, depending on a method for adhering the touch sensor panel 100 to the display module 200, the spacer layer 420 between the touch sensor panel 100 and the display module 200 may be implemented in the form of an air gap.

Here, a double adhesive tape (DAT) 430 may be used to fix the touch sensor panel 100 and the display module 200. For example, the areas the touch sensor panel 100 and the display module 200 are overlapped with each other. The touch sensor panel 100 and the display module 200 are adhered to each other by adhering the edge portions of the touch sensor panel 100 and the display module 200 through use of the DAT 430. The rest portions of the touch sensor panel 100 and the display module 200 may be spaced apart from each other by a predetermined distance "d".

In general, even when the touch surface is touched without bending the touch sensor panel 100, the capacitance (Cm) 101 between the drive electrode TX and the receiving electrode RX is changed. That is, when the touch occurs on the touch sensor panel 100, the mutual capacitance (Cm) 101 may become smaller than a base mutual capacitance. This is because, when the conductive object like a finger approaches close to the touch sensor panel 100, the object functions as the ground GND, and then a fringing capacitance of the mutual capacitance (Cm) 101 is absorbed in the object. The base mutual capacitance is the value of the mutual capacitance between the drive electrode TX and the receiving electrode RX when there is no touch on the touch sensor panel 100.

When the object touches the top surface, i.e., the touch surface of the touch sensor panel 100 and a pressure is applied to the top surface, the touch sensor panel 100 may be bent. Here, the value of the mutual capacitance (Cm) 101 between the drive electrode TX and the receiving electrode RX may be more reduced. This is because the bend of the touch sensor panel 100 causes the distance between the touch sensor panel 100 and the reference potential layer to be reduced from "d" to "d'", so that the fringing capacitance of the mutual capacitance (Cm) 101 is absorbed in the reference potential layer as well as in the object. When a nonconductive object touches, the change of the mutual capacitance (Cm) 101 is simply caused by only the change of the distance "d-d'" between the touch sensor panel 100 and the reference potential layer.

As described above, the touch input device 1000 is configured to include the touch sensor panel 100 and the pressure detection module 400 on the display module 200, so that not only the touch position but also the touch pressure can be simultaneously detected.

However, as shown in FIG. 2, when the pressure detection module 400 as well as the touch sensor panel 100 is disposed on the display module 200, the display properties of the display module is deteriorated. Particularly, when the air gap 420 is included on the display module 200, the visibility and optical transmittance of the display module may be lowered.

Accordingly, in order to prevent such problems, the air gap is not disposed between the display module 200 and the touch sensor panel 100 for detecting the touch position. Instead, the touch sensor panel 100 and the display module 200 can be fully laminated by means of an adhesive like an optically clear adhesive (OCA).

In the description related to FIGS. 1 and 2, the configuration of the touch input device 1000 to which the touch pressure sensitivity correction method according to the embodiment of the present invention is applied has been specified in order to describe the principle of detecting the touch position and the touch pressure. However, the touch pressure sensitivity correction method according to the embodiment of the present invention can be applied to any touch input device which is capable of the touch pressure and has a different structure from those shown in FIGS. 1 and 2.

As described above, the pressure detection is made based on the distance change between the electrodes, furthermore, the capacitance change between the electrodes by the bending due to the application of a predetermined pressure to the touch sensor panel 100. However, how much the touch sensor panel 100 is bent cannot be the same at all the positions. Particularly, the edge of the touch sensor panel 100 is fixed to the case and is less bent than the central portion of the touch sensor panel 100 even if the same pressure is applied.

FIG. 3a is a graph showing a capacitance change amount which is sensed when the same pressure is applied to each position of such a touch sensor panel 100. In the graph of FIG. 3a, an x-axis and a y-axis represent a horizontal axis position and a vertical axis position respectively. A z-axis represents the sensed capacitance change amount. As shown in FIG. 3a, when the same pressure is applied, the capacitance change amount varies depending on the position. The central portion of the touch sensor panel 100 has a large capacitance change amount. The capacitance change amount decreases toward the edge of the touch sensor panel 100.

This means that the edge of the touch sensor panel 100 has a lower sensitivity than that of the central portion of the touch sensor panel 100. This is an unavoidable problem in the manufacturing process and structure of the touch sensor panel 100. Ideally, as shown in FIG. 3b, it is preferable for all the areas of the touch sensor panel 100 to have the same sensitivity. Therefore, the present invention provides the touch pressure sensitivity correction method which allows the capacitance change amount sensed at all the positions of the touch sensor panel 100 to be, as shown in FIG. 3b, uniform through the touch pressure sensitivity correction.

FIG. 4 is a flowchart showing the touch pressure sensitivity correction method according to the embodiment of the present invention.

First, a plurality of reference points are defined on the touch sensor panel 100 included in the touch input device 1000 (S110). After a predetermined pressure is applied to the defined reference point, a reference data is generated which corresponds to a sensed capacitance change amount (S120).

When the reference data is generated, the capacitance change amount for a random point present between the defined reference points is calculated by interpolation, and then an interpolated data is generated (S130).

The generated reference data and interpolated data have information on the capacitance change amount for all the positions of the touch sensor panel 100. Based on the generated reference data and interpolated data, a correction factor for setting the sensitivity of the touch input device to a target value is calculated (S140).

Lastly, the calculated correction factor is applied to each corresponding point, so that the sensitivity of the touch input device 1000 is uniformly corrected (S150).

Hereafter, each step which is shown in the flowchart of FIG. 4 and is included in the touch pressure sensitivity correction method according to the embodiment of the present invention will be described in detail.

Reference Point Definition Step (S110)

The plurality of the reference points are defined on the touch sensor panel 100 included in the touch input device 1000. Imaginary horizontal and vertical lines are set on the touch sensor panel 100, and then the reference point may be defined as being located at the intersection of the horizontal line and vertical lines.

Here, it is preferable that at least two horizontal lines and at least two vertical lines should be provided. Therefore, at least four reference points can be defined.

The reference points defined in this way are shown in FIGS. 5a and 5b. In FIGS. 5a and 5b, dotted lines correspond to the above-described horizontal line or vertical line. Circles marked with alphabets represent the defined reference points.

FIG. 5a shows that a total of 15 reference points from "A" to "O" are defined at the intersections of five horizontal lines and three vertical lines. FIG. 5b shows that a total of 12 reference points from "A" to "L" are defined at the intersections of four horizontal lines and three vertical lines.

Needless to say, a larger or smaller number of the reference points can be defined. Hereafter, for convenience of description and understanding, the following description will be provided by assuming that a total of 15 reference points and a total of 12 reference points are defined.

Reference Data Generation Step (S120)

When the reference data is defined, a predetermined pressure is applied to the position where the reference data exists. Here, it is preferable that the pressure to be applied should have a similar magnitude to that of a human finger.

When the pressure is applied to each reference point, the capacitance change amount for the applied pressure is detected. Since the detection of the capacitance change amount has been described above, the description thereof will be omitted.

The detected capacitance change amount for each reference point is used to generate the reference data. For example, when the 15 reference points are, as shown in FIG. 5a, defined, the capacitance change amounts for the reference points from "A" to "O" are recorded in the reference data. When the 12 reference points are, as shown in FIG. 5b, defined, the capacitance change amounts for the reference points from "A" to "L" are recorded in the reference data. The reference data includes the capacitance change amount and position of each reference point.

Interpolated Data Generation Step (S130)

While the reference data is generated by directly applying the pressure to the defined reference point and by directly detecting the capacitance change amount for the applied pressure, the interpolated data is calculated based on the capacitance change amount detected at the defined reference point.

Here, the interpolated data corresponding to the capacitance change amount for a random point is calculated based on a spaced distance from the plurality of the reference points and the reference data generated in step S120. Hereinafter, various embodiments of the interpolated data generation step (S130) according to the embodiment of the present invention will be described.

First, the touch pressure sensitivity correction method according to the embodiment of the present invention may generate the interpolated data by linear interpolation. Linear interpolation and bilinear interpolation may be used as the linear interpolation.

When the capacitance change amount for a random point between two reference points is estimated, the linear interpolation is to linearly determine the capacitance change amount for the random point in accordance with a straight-line distance from the two reference points.

When the capacitance change amounts of four reference points of a rectangle are known, the bilinear interpolation is to estimate the capacitance change amount of a random point on the sides of the rectangle and within the inside of the rectangle.

FIG. 6 is a view for describing the linear interpolation, i.e., an embodiment where the interpolated data is generated in the touch pressure sensitivity correction method according to the embodiment of the present invention. In FIG. 6, $Q_{12}$, $Q_{22}$, $Q_{11}$, and $Q_{21}$ correspond to four reference points on the vertices of the rectangle among the plurality of the reference points. Random points $R_2$, P, and $R_1$ are displayed.

First, the capacitance change amounts of random points $R_2$ and $R_1$ may be calculated by the linear interpolation. The values of R2 (x, $y_1$) and R1 (x, $y_2$) may be defined by the following equation (1).

$$f(x, y_1) \approx \frac{x_2 - x}{x_2 - x_1} f(Q_{11}) + \frac{x - x_1}{x_2 - x_1} f(Q_{21})$$

$$f(x, y_2) \approx \frac{x_2 - x}{x_2 - x_1} f(Q_{12}) + \frac{x - x_1}{x_2 - x_1} f(Q_{22})$$

equation (1)

Here, x and y represent coordinate values. $f(Q_x)$ represents the value of the capacitance change amount detected at the reference point $Q_x$.

Meanwhile, by applying the linear interpolation again to the random point P, the value of the random point P (x,y) may be defined by the following equation (2).

$$\begin{aligned}f(x, y) &\approx \frac{y_2 - y}{y_2 - y_1} f(x, y_1) + \frac{y - y_1}{y_2 - y_1} f(x, y_2) \\ &\approx \frac{y_2 - y}{y_2 - y_1}\left(\frac{x_2 - x}{x_2 - x_1} f(Q_{11}) + \frac{x - x_1}{x_2 - x_1} f(Q_{21})\right) + \\ &\quad \frac{y - y_1}{y_2 - y_1}\left(\frac{x_2 - x}{x_2 - x_1} f(Q_{12}) + \frac{x - x_1}{x_2 - x_1} f(Q_{22})\right) \\ &= \frac{1}{(x_2 - x_1)(y_2 - y_1)}(f(Q_{11})(x_2 - x)(y_2 - y) + \\ &\quad f(Q_{21})(x - x_1)(y_2 - y) + f(Q_{12})(x_2 - x)(y - y_1) + \\ &\quad f(Q_{22})(x - x_1)(y - y_1))\end{aligned}$$

equation (2)

Here, x and y represent the coordinate value for each axis. $f(Q_x)$ represents the value of the capacitance change amount detected at the reference point $Q_x$.

That is, when the spaced distance from the reference point and the value of the reference data are defined, the capacitance change amount for the random point present between the reference points may be calculated by the equation (2), and the capacitance change amounts for a predetermined number of the random points are calculated by the above formula, so that the interpolated data may be generated.

Also, in the touch pressure sensitivity correction method according to the embodiment of the present invention, the interpolated data may be generated by bicubic interpolation. FIG. 7 is a view for describing the bicubic interpolation as an embodiment where the interpolated data is generated by the touch pressure sensitivity correction method according to the embodiment of the present invention.

Unlike the linear interpolation, the graph of FIG. 7 has a cubic function graph and is represented by a general formula shown in the following equation (3).

$$f(x) = ax^3 + bx^2 + cx + d$$

$$f(x) = 3ax^2 + 2bx + c$$

Equation (3)

In the above equation, the coordinates and values of $P_0$, $P_1$, $P_2$, and $P_3$ are substituted in order to obtain the coefficient a, b, c, and d respectively, the following equation (4) is derived.

$$f(0) = d \qquad f(0) = P_1$$
$$f(1) = a + b + c + d \quad f(1) = P_2$$

Equation (4)

$$f'(0) = d \qquad f'(0) = \frac{P_2 - P_0}{2}$$

$$f'(1) = 3a + 2b + c \qquad f'(1) = \frac{P_3 - P_1}{2}$$

By substituting the equation (4) into the equation (3), the value of each of the coefficients is calculated as follows.

$$a = -\frac{1}{2}P_0 + \frac{3}{2}P_1 - \frac{3}{2}P_2 + \frac{1}{2}P_3$$

$$b = P_0 - \frac{5}{2}P_1 + 2P_2 - \frac{1}{2}P_3$$

$$c = -\frac{1}{2}P_0 + \frac{1}{2}P_2$$

$$d = P_1$$

The each calculated coefficient is substituted into the equation (3), the following equation (6) for the x-coordinate is derived.

$$f(P_0, P_1, P_2, P_3, x) = \left(-\frac{1}{2}P_0 + \frac{3}{2}P_1 - \frac{3}{2}P_2 + \frac{1}{2}P_3\right)x^3 + \left(P_0 - \frac{5}{2}P_1 + 2P_2 - \frac{1}{2}P_3\right)x^2 + \left(-\frac{1}{2}P_0 + \frac{1}{2}P_2\right)x + P_1 \qquad \text{Equation (6)}$$

Based on the equation (6), a formula for obtaining the capacitance change amount at the random point (x,y) may be generalized as the following equation (7).

$$g(x,y) = f(f(P_{00}, P_{01}, P_{02}, P_{03}, P_{03}, y), f(P_{10}, P_{11}, P_{12}, P_{13}, y), f(P_{20}, P_{21}, P_{22}, P_{23}, y), f(P_{30}, P_{31}, P_{32}, P_{33}, y), x) \qquad \text{Equation (7)}$$

As such, when the spaced distance from the reference point and the value of the reference data are defined, the capacitance change amount for the random point present between the reference points may be calculated by the equation (7), and the capacitance change amounts for a predetermined number of the random points are calculated by the above formula, so that the interpolated data may be generated.

Meanwhile, in the touch pressure sensitivity correction method according to the embodiment of the present invention, the interpolated data may be generated by profile based estimation.

First, as shown on the left side of FIG. 8, two or more profiles of the capacitance change amounts are created. In the graph of FIG. 8, the x-axis and y-axis at the bottom surface mean respective axes of the display surface of the touch input device, and the z-axis means the capacitance change amount detected by applying the same pressure to a predetermined number of coordinates. The profile created for a plurality of the touch input devices may be used to generate the interpolated data closer to a real data.

While FIG. 8 shows four profiles of the capacitance change amount, that is to say, the profiles obtained from the four touch input devices, a smaller or greater number of profiles than this can be used. As shown in FIG. 8, based on a plurality of the profiles, the average value is calculated, and thus, a base profile shown on the right side can be created.

With regard to the base profile creation, an available profile extraction method includes low level feature extraction method such as curvature detection algorithm, edge detection algorithm, etc., shape matching method such as template matching algorithm, Hough transform algorithm, etc., and flexible shape extraction method such as deformable templates algorithm, Snakes algorithm, etc. However, this is just an example, and various profile extraction methods other than this may be used.

When the base profile is created, a deviation between the reference data and the data of the base profile is calculated and then, a delta data is generated. Referring to FIG. 9, the capacitance change amounts the reference point a, the reference point b, the reference point c, and the reference point d of the reference data is compared with the capacitance change amount of the base profile corresponding to the coordinates of the reference point a, the reference point b, the reference point c, and the reference point d, the deviation value Δa, Δb, Δc, and Δd are calculated.

Then, for the purpose of generating the interpolated data, based on the coordinate values of random points x, y, and z (or spaced distances between the reference point and the random points x, y, and z) and the deviation values generated with respect to the reference point, the deviation values of x, y, and z can be calculated by using the above-described linear interpolation or bicubic interpolation.

When the deviation values of all the random points are calculated, the delta data can be generated. Then, based on the delta data and the spaced distance from the plurality of the reference points, the capacitance change amount of the random point is calculated, so that the interpolated data may be generated. That is, a function based on the delta data and the coordinates of a plurality of the reference points is calculated, and the coordinate of the random point is substituted into the function, so that the interpolated data is generated.

FIG. 10 is a graph showing the comparison of the interpolated data generated by each method and the real data. In FIG. 10, points a, b, and c represent the reference point, and points x, y, z, and k are random points. The capacitance change amount is calculated by the above-described each method.

The solid line connecting the points a, b, and c represents the real data. The dotted line connecting the random points x, y, z, and k and the reference points a, b, and c is a graph based on the interpolated data generated by the linear interpolation. The alternated long and short dash line connecting the random points x, y, z, and k and the reference points a, b, and c is a graph based on the interpolated data generated by the bicubic interpolation. The alternate long and tow short dashes line connecting the random points x, y, z, and k and the reference points a, b, and c is a graph based on the interpolated data generated by profile-based interpolation.

The pattern of the interpolated data generated by the linear interpolation is somewhat different from the pattern of the real data for the random point. However, they show similar directionality in terms of the increase and decrease of the tilt, so that the linear interpolation can be used in the touch pressure sensitivity correction method according to the embodiment of the present invention.

Also, by using the bicubic interpolation, a pattern more similar to the real data than that by the linear interpolation is obtained. Therefore, sensitivity correction can be made more finely.

Furthermore, by using the profile-based interpolation, a pattern which is very similar to that of the real data is obtained. Therefore, the most ideal sensitivity correction can be made.

Correction Factor Calculation Step (S140)

For the entire surface of the touch sensor panel 100, the reference data and the interpolated data have information on the capacitance change amount corresponding to each position.

Here, a target value for setting a uniform sensitivity for the entire surface of the touch sensor panel 100 may be predetermined. Alternatively, the target value can be set after the reference data and the interpolated data are generated.

The target value is used together with the reference data and the interpolated data to calculate the correction factor at the reference point and random point. The correction factor may be an inverse number of the capacitance change amount recorded in each data. Unlike this, the correction factor may be a value obtained by multiplying the inverse number of the capacitance change amount recorded in each data by the target value.

For example, when the target value is 3000 and the capacitance change amount (detected by directly applying the pressure) at the reference point "A" is 962, the correction factor at the reference point "A" may be 1/962 or may be 3000/962 obtained by multiplying 1/962 by the target value. Also, when the target value is 3000 and the capacitance change amount at the random point "x" is 1024, the correction factor at the random point "x" may be 1/1024 or may be 3000/1024 obtained by multiplying 1/1024 by the target value.

As such, the correction factors at the defined reference point, the random set point, and all the points are calculated.

Sensitivity Correction Step (S150)

The correction factor calculated for all the points (reference point and random point) present in the touch sensor panel 100 is used to uniformly correct the sensitivity of the touch input device 1000.

That is, by multiplying the capacitance change amount corresponding to the position of each point by the correction factor, the capacitance change amount finally sensed come to have a uniform value as a whole.

FIGS. 9*a*, 9*b*, 10*a* and 10*b* show graphs and data which show a result obtained by applying the touch pressure sensitivity correction method according to the embodiment of the present invention.

A total of three sets of the touch input devices 1000 are assumed. A total of 45 points including the reference points and random points are set. Here, when the 15 reference points are provided as shown in FIG. 5*a*, 30 random points may be set. When the 12 reference points are provided as shown in FIG. 5*b*, 33 random points may be set. Here, FIGS. 11*a* and 11*b* show the sensitivity correction method sensed by applying the same pressure to all of the points as comparison targets.

FIGS. 11*a* and 11*b* show the capacitance change amount of the touch input device when the correction is not made. FIG. 11*a* can be understood as a graph corresponding to FIG. 3.

Here, the horizontal axis of FIG. 11*a* represents the measurement position. The numbers of the horizontal axis are set in the manner of sequentially scanning each row of FIG. 11*b*. For example, (1,A), (1,B), (1,C), (1,D), and (1,E) of FIG. 11*b* correspond to 1, 2, 3, 4, and 5 listed on the horizontal axis of FIG. 11*a* respectively. Also, (2,A), (2,B), (2,C), (2,D), and (2,E) of FIG. 11*b* correspond to 6, 7, 8, 9, and 10 listed on the horizontal axis of FIG. 11*a* respectively. The position of each cell of FIG. 11*b* may correspond to the position of the touch sensor panel 100.

Referring to FIGS. 11*a* and 11*b*, it can be seen that the capacitance change amount for each point is not uniform even though the same pressure is applied.

FIGS. 12*a* and 12*b* show the capacitance change amount after the touch pressure sensitivity correction is made according to the embodiment of the present invention. Particularly, as shown in FIG. 5*a*, FIGS. 12*a* and 12*b* show that the 15 reference points are defined and then the correction factor is finally calculated.

Referring to FIGS. 12*a* and 12*b*, it can be understood that when the correction factor calculated for each of the 45 points is applied, the overall uniform capacitance change amount for the all the 45 points is sensed. This means that the sensitivity of the touch input device 1000 becomes uniform.

Referring to the data of FIG. 12*b*, it can be seen that cells of (1,A), (1,C), (1,E), (3,A), (3,C), (3,E), (5,A), (5,C), (5,E), (7,A), (7,C), (7,E), (9,A), (9,C), and (9,E) have all the target value of 3000. The cell corresponds to the reference point at which the capacitance change amount has been directly sensed. The cell has the target value of 3000 as it is because the correction factor obtained by multiplying the inverse number of the capacitance change amount by the target value is multiplied by the capacitance change amount again.

However, there may be a slight error between the target value and the sensitivity of the remaining points because the capacitance change amounts of the remaining points are calculated based on the capacitance change amount value on the reference point. However, this corresponds to a sensitivity which is difficult for the user to recognize, so that it is possible to ensure an ideal pressure touch sensitivity shown in FIG. 3*b*.

FIGS. 13*a* and 13*b* show the capacitance change amount after the touch pressure sensitivity correction is made according to the embodiment of the present invention. Particularly, as shown in FIG. 5*b*, FIGS. 13*a* and 13*b* show that the 12 reference points are defined and then the correction factor is finally calculated.

Referring to FIGS. 13*a* and 13*b*, it can be understood that when the correction factor calculated for each of the 45 points is applied, the overall uniform capacitance change amount for the all the 45 points is sensed. This means that the sensitivity of the touch input device 1000 becomes uniform.

Referring to the data of FIG. 13*b*, it can be seen that cells of (1,A), (1,C), (1,E), (4,A), (4,C), (4,E), (6,A), (6,C), (6,E), (9,A), (9,C), and (9,E) have all the target value of 3000. The cell corresponds to the reference point at which the capacitance change amount has been directly sensed. The cell has the target value of 3000 as it is because the correction factor obtained by multiplying the inverse number of the capacitance change amount by the target value is multiplied by the capacitance change amount again.

However, even in this case, there may be a slight error between the target value and the capacitance change amount of the remaining points because the remaining points are based on the capacitance change amount value calculated based on the reference point. However, this corresponds to a sensitivity which is difficult for the user to recognize, so that it is possible to ensure an ideal pressure touch sensitivity shown in FIG. 3*b*.

Meanwhile, in the touch pressure sensitivity correction method according to the embodiment of the present invention, a first correction step S200 of FIG. 4 may be performed in advance. FIG. 14 is a flowchart showing the first correction step (a preliminary correction step) which is applied to the touch pressure sensitivity correction method according to the embodiment of the present invention.

In the first correction step, first, a plurality of position points are defined on the touch sensor panel included in a plurality of the touch input devices (S210). While the sensitivity correction can be made only by one touch input device 1000 in the method of FIG. 4 described above, at least two touch input devices 100 are required to perform the first correction.

When the plurality of the position points are defined, the capacitance change amount is sensed by applying the same pressure (S220). Here, the step S220 is performed on the plurality of the touch input devices, and the capacitance change amount at mutually corresponding is extracted in each touch input device, and then an average value thereof is calculated. By performing such a process on all the position points, the average value of the capacitance change amount for all the position points can be calculated and an average value data is generated based on the average value (S230).

The generated average value data is used to calculate a first correction factor for the first correction (S240). Here, the first correction factor may be an inverse number of the average value or may be a value obtained by multiplying the inverse number by the target value.

The sensitivity of the touch input device is corrected by applying the first calculated correction factor to the plurality of the position points (S250).

Hereafter, each step for performing the first correction will be described in more detail.

Position Point Definition Step (S210)

In the first correction, the position point may correspond to the reference point and random point which are defined in the manner of FIG. 4. That is, when the 15 reference points and 30 random points are defined in the manner of FIG. 4, the position point may be also disposed in the areas where the 15 reference points and 30 random points are located. Also, when the 12 reference points and 33 random points are defined, the position point may be also disposed in the areas where the 12 reference points and 33 random points are located.

Capacitance Change Amount Sensing Step (S220)

The same pressure is applied to the plurality of the position points. Here, it is preferable that the pressure which is applied to each of the position points should have a similar magnitude to that of a human finger.

When the same pressure is applied to each of the position points, the capacitance change amount for the applied pressure is detected. Since the detection of the capacitance change amount has been described above, the description thereof will be omitted.

Average Data Generation Step (S230)

For example, as shown in FIGS. 11a and 11b, in the three touch input devices, the capacitance change amount for each position point may be detected. Three data shown in FIG. 11b represent the capacitance change amounts detected from the three touch input devices respectively. The average value of the capacitance change amounts (capacitance change amounts recorded in the same cell) corresponding to the same position point is calculated and then the average value data is generated.

First Correction Factor Calculation Step (S240)

When the average value data is generated, the first correction factor for each position point is calculated based on the average value data. The first correction factor may be an inverse number of the average value calculated for each position point or may have a value obtained by multiplying the inverse number by the target value.

Touch Pressure Sensitivity Correction Step (S240)

The first calculated correction factor is used to primarily correct the sensitivity of the touch input device. The correction of the primarily corrected sensitivity of the touch input device is made again by performing again the substantive correction steps (S110 to S150 of FIG. 4).

FIGS. 15a and 15b are a graph and data showing the sensitivity of the touch input device, to which the first correction has been applied. Through the first correction, a graph which is much more uniform than the graph before the correction (see FIG. 11a) can be obtained. This means that the sensitivity of the touch input device becomes uniform through the first correction.

FIGS. 16a and 16b show the capacitance change amount at each position point (reference point and random point) when the substantive correction steps (S110 to S150 of FIG. 4) has been performed one more time after the first correction is made. Particularly, FIGS. 16a and 16b show that the correction is made when the 15 reference points and the 30 random points are set.

Compared to the case where only the substantive correction is made without the first correction (see FIG. 12a), it can be found that the touch input device which has performed both of the first correction and the substantive correction has a more uniform pressure touch sensitivity.

FIGS. 17a and 17b show the capacitance change amount at each position point (reference point and random point) when the substantive correction steps (S110 to S150 of FIG. 4) has been performed one more time after the first correction is made. Particularly, FIGS. 17a and 17b show that the correction is made when the 12 reference points and the 33 random points are set.

Compared to the case where only the substantive correction is made without the first correction (see FIG. 13a), it can be found that the touch input device which has performed both of the first correction and the substantive correction has a more uniform pressure touch sensitivity.

Meanwhile, the present invention may be implemented in the form of a computer-readable recording medium which records a program performing each of the steps included in the above-described touch pressure sensitivity correction method.

In other words, the steps S110 to S150 (including or not the steps S210 to S250) can be performed by the program recorded in the recording medium according to the embodiment of the present invention.

The program instruction which is recorded in the computer readable recording medium may be specially designed and configured for the present invention or may be well-known and available to those skilled in the field of computer software.

The computer-readable recording medium may include a hardware device, for example, a magnetic medium such as a hard disk, a floppy disk, and a magnetic tape, an optical recording medium such as CD-ROM, DVD, a magneto-optical medium such as a floptical disk, and ROM, RAM, flash memory, etc., which is especially configured to store and perform program instructions.

The program instruction may include not only a machine language code which is formed by a complier but also high-level language code which can be executed by a computer using an interpreter, etc.

The hardware device may be configured to operate as one or more software modules in order to perform the process according to the present invention, and vice versa.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch pressure sensitivity correction method comprising:
    defining a plurality of reference points on a touch sensor panel;
    generating a reference data for an electrical characteristic change amount sensed by applying the same pressure to the plurality of reference points;
    generating an interpolated data corresponding to an electrical characteristic change amount for a random point located between the plurality of reference points;
    calculating, on the basis of the reference data and the interpolated data, for each of the reference points and the random point, a correction factor for correcting a touch pressure sensitivity of a touch input device to a target value; and
    uniformly correcting the touch pressure sensitivity of the touch input device by applying the calculated correction factor to each corresponding point;
    wherein the generating an interpolated data comprises:
    creating a base profile on the basis of two or more profiles of the electrical characteristic change amount;
    generating a delta data by calculating a deviation between an electrical characteristic change amount of the base profile and an electrical characteristic change amount of the reference data, with respect to coordinates of the plurality of reference points; and
calculating the electrical characteristic change amount for the random point on the basis of the delta data.

2. The touch pressure sensitivity correction method of claim 1, wherein, in the generating an interpolated data, the interpolated data corresponding to the electrical characteristic change amount for the random point is generated based on the reference data and a spaced distance from the plurality of reference points.

3. The touch pressure sensitivity correction method of claim 2, wherein the correction factor corresponds to a value obtained by dividing the target value by the electrical characteristic change amount recorded in the reference data and in the interpolated data and is calculated for each of the reference points and the random point.

4. The touch pressure sensitivity correction method of claim 2, wherein, in the defining the reference point, the reference point is located at an intersection of n number of horizontal lines parallel to each other and m number of vertical lines parallel to each other on the touch sensor panel, so that n×m (n and m are natural numbers equal to or greater than 2) number of the reference points are defined.

5. The touch pressure sensitivity correction method of claim 1, wherein the profile is a data recording the electrical characteristic change amount detected by applying the same pressure to a plurality of coordinates, with respect to a plurality of the touch input devices manufactured in the same process.

6. The touch pressure sensitivity correction method of claim 1, wherein, in the generating an interpolated data, the interpolated is generated by calculating the electrical characteristic change amount for the random point, on the basis of the delta data and a spaced distance from the plurality of reference points.

7. The touch pressure sensitivity correction method of claim 1, wherein, in the generating an interpolated data, a function based on the delta data and coordinates of the plurality of reference points is generated, and a coordinate of the random point is substituted into the function, so that the interpolated data corresponding to the electrical characteristic change amount for the random point is calculated.

8. A non-transitory computer-readable storage medium encoded with instructions which, when executed on a processor, perform the method of claim 1.

9. A touch pressure sensitivity correction method comprising:
    defining a plurality of reference points on a touch sensor panel;
    generating a reference data for an electrical characteristic change amount sensed by applying the same pressure to the plurality of reference points;
    generating an interpolated data corresponding to an electrical characteristic change amount for a random point located between the plurality of reference points;
    calculating, on the basis of the reference data and the interpolated data, for each of the reference points and the random point, a correction factor for correcting a touch pressure sensitivity of a touch input device to a target value; and
    uniformly correcting the touch pressure sensitivity of the touch input device by applying the calculated correction factor to each corresponding point,
    wherein, in the generating an interpolated data, a function based on the reference data and coordinates of the plurality of reference points is generated, and a coordinate of the random point is substituted into the function, so that the interpolated data corresponding to the capacitance change amount for the random point is calculated,
    wherein the correction factor corresponds to a value obtained by dividing the target value by the electrical characteristic change amount recorded in the reference data and in the interpolated data and is calculated for each of the reference points and the random point.

10. A non-transitory computer-readable storage medium encoded with instructions which, when executed on a processor, perform the method of claim 9.

11. A touch pressure sensitivity correction method comprising:
    defining a plurality of reference points on a touch sensor panel;
    generating a reference data for an electrical characteristic change amount sensed by applying the same pressure to the plurality of reference points;
    generating an interpolated data corresponding to an electrical characteristic change amount for a random point located between the plurality of reference points;

calculating, on the basis of the reference data and the interpolated data, for each of the reference points and the random point, a correction factor for correcting a touch pressure sensitivity of a touch input device to a target value; and uniformly correcting the touch pressure sensitivity of the touch input device by applying the calculated correction factor to each corresponding point, wherein, in the generating an interpolated data, a function based on the reference data and coordinates of the plurality of reference points is generated, and a coordinate of the random point is substituted into the function, so that the interpolated data corresponding to the capacitance change amount for the random point is calculated, wherein, in the defining the reference point, the reference point is located at an intersection of n number of horizontal lines parallel to each other and m number of vertical lines parallel to each other on the touch sensor panel, so that n×m (n and m are natural numbers equal to or greater than 2) number of the reference points are defined.

12. A non-transitory computer-readable storage medium encoded with instructions which, when executed on a processor, perform the method of claim 11.

* * * * *